(12) United States Patent
Gibbs et al.

(10) Patent No.: US 6,354,428 B1
(45) Date of Patent: Mar. 12, 2002

(54) CONVEYOR BELT SCRAPING APPARATUS

(75) Inventors: A. Todd Gibbs, Allentown; George T. Mott, Alburtis, both of PA (US)

(73) Assignee: ASGCO Manufacturing, Inc., Allentown, PA (US)

(*) Notice: Subject to any disclaimer, the term of this patent is extended or adjusted under 35 U.S.C. 154(b) by 0 days.

(21) Appl. No.: 09/495,510

(22) Filed: Feb. 1, 2000

Related U.S. Application Data (60) Provisional application No. 60/153,167, filed on Sep. 9, 1999.

(51) Int. Cl.$^7$ ................................................ B65G 45/12
(52) U.S. Cl. .................................................... 198/497
(58) Field of Search ................................. 198/497, 499

(56) References Cited

U.S. PATENT DOCUMENTS

| | | | |
|---|---|---|---|
| 3,998,322 A | 12/1976 | McBride | |
| 4,598,823 A | 7/1986 | Swinderman | |
| 4,854,443 A | * 8/1989 | Gordon | 198/497 |
| 4,953,689 A | * 9/1990 | Peterson et al. | 198/497 |
| 4,962,845 A | 10/1990 | Gibbs | |
| 5,011,002 A | 4/1991 | Gibbs | |
| 5,197,587 A | * 3/1993 | Malmberg | 198/497 |
| 5,222,588 A | 6/1993 | Gordon | |
| 5,301,797 A | * 4/1994 | Hollyfield et al. | 198/499 |
| 5,573,102 A | 11/1996 | Puchalla | |
| 5,797,477 A | 8/1998 | Veenhof | |

FOREIGN PATENT DOCUMENTS

| | | | |
|---|---|---|---|
| GB | 2221440 | * 2/1990 | 198/497 |

OTHER PUBLICATIONS

Martin Engineering, *Product Detail Page –Belt Cleaner*, Jul. 28, 1999, p. 1 of 2.

* cited by examiner

*Primary Examiner*—Joseph E. Valenza
(74) *Attorney, Agent, or Firm*—Dann, Dorfman, Herrell and Skillman, P.C.

(57) ABSTRACT

A conveyor belt scraping apparatus comprises a blade having a blade edge biased against a conveyor belt. The blade is supported at its base and has a blade body extending from the base to support the blade edge. The scraper blade body has a substantially rectangular recess in the base adapted for frictional mounting on a flange for engaging the surface of a conveyor belt for scraping material therefrom. A blade assembly of the present invention includes a mounting having a plurality of radial flanges and one or more scraper blades each having a blade body with an edge distal from its base and at least one substantially rectangular recess in the base frictionally mounted on at least one of the plurality of flanges, but not in mechanical locking engagement thereto.

23 Claims, 10 Drawing Sheets

PRIOR ART

CONVEYOR BELT SCRAPING APPARATUS

This Application claims the benefit of U.S. Provisional Application Ser. No. 60/153,167 filed Sep. 9, 1999.

The present invention relates to conveyors and, in particular, to scraping apparatus for a conveyor.

Conveyors are widely used to quickly and efficiently move objects and material from one location to another. A conveyor includes a continuous loop conveyor belt that is looped over a rotatable head pulley and a rotatable tail pulley. The head pulley is powered to rotate in a direction that pulls the portion of the conveyor belt that is between the tops of the head and tail pulleys toward the head pulley to convey material to that location. The lower portion of the conveyor belt is slack and moves from the head pulley towards the tail pulley. Objects and material may be loaded onto the conveyor belt at any location or locations along the top portion thereof and are unloaded or discharged at the location of the head pulley as the conveyor belt moves downward as it travels around the head pulley. Where the belt is long or the load heavy, the belt is supported intermediate the head and tail pulleys on rollers, slider bars and other conventional support arrangements.

The efficiency of the conveyor depends upon completely discharging the load at the head pulley. Although some loads discharge simply by falling off the conveyor belt under the influence of gravity as the belt travels around the head pulley, other loads, such as loads including wet and/or sticky materials, tend to adhere to the conveyor belt and so would be carried along with the belt as it returns toward the tail pulley.

Discharge efficiency is improved by employing a scraper at the head pulley to bear against the conveyor belt as it travels around the head pulley so as to scrape material and deposits off of the conveyor belt to clean the belt, which material would otherwise adhere to the surface of the conveyor belt.

A common type of scraper assembly comprises a blade positioned transverse to the direction of belt travel or movement and bearing against the belt where it travels around the head pulley. A mounting tube supporting the blade via mounting brackets to nearby structure includes a tensioning system to bias the blade against the belt. Conventional blade mounting arrangements employ bolts, clamps, special brackets, locking arrangements and the like to attach and secure the blade to the mounting arrangement that tensions the blade against the conveyor belt.

All of these arrangements are susceptible to malfunction, wear, corrosion and stress as a result of the rigors of use, not the least of which are the effects of the dirt and grit that are ever present in many applications, for example, mining and quarrying. The necessary periodic replacement of the scraper blade which necessarily wears with use imposes additional costs and requires additional labor, and may even require the stopping of the conveyor, thereby causing the loss of production. Conventional scraper blade attachment arrangements require considerable time to clean and to release the worn or damaged scraper blade, and so delay production and add undesirable cost.

Accordingly, there is a need for a scraping apparatus that avoids the many of the problems of conventional scrapers and desirably incorporates a replaceable scraper blade that is easily and quickly removable, for example, for replacement.

To this end, the blade of the present invention comprises a blade body having a base and a blade edge distal from the base, the blade body having a substantially rectangular recess in the base thereof adapted for frictional mounting on a flange. According to another aspect of the present invention, a blade assembly comprises a mounting having a plurality of radially extending flanges, and at least one blade comprising a blade body having a base and an edge distal from the base, the blade body having at least one substantially rectangular recess in the base thereof frictionally mounted on one of the plurality of radially extending flanges.

BRIEF DESCRIPTION OF THE DRAWING

The detailed description of the preferred embodiments of the present invention will be more easily and better understood when read in conjunction with the FIGURES of the Drawing which include.

In the Drawing, where an element or feature is shown in more than one drawing figure, the same alphanumeric designation may be used to designate such element or feature in each figure, and where a closely related or modified element is shown in a figure, the same alphanumerical designation primed may be used to designate the modified element or feature.

DESCRIPTION OF THE PREFERRED EMBODIMENT

A blade in accordance with the present invention has a blade body with a scraping edge distal from its base, and has at least one substantially rectangular recess in the base adapted for frictional mounting on at least one flange. A blade assembly of the present invention includes a mounting having a plurality of radial flanges and one or more blades each having a blade body with a scraping edge distal from its base and at least one substantially rectangular recess in the base frictionally mounted on one or more of the plurality of flanges.

Figure 1:
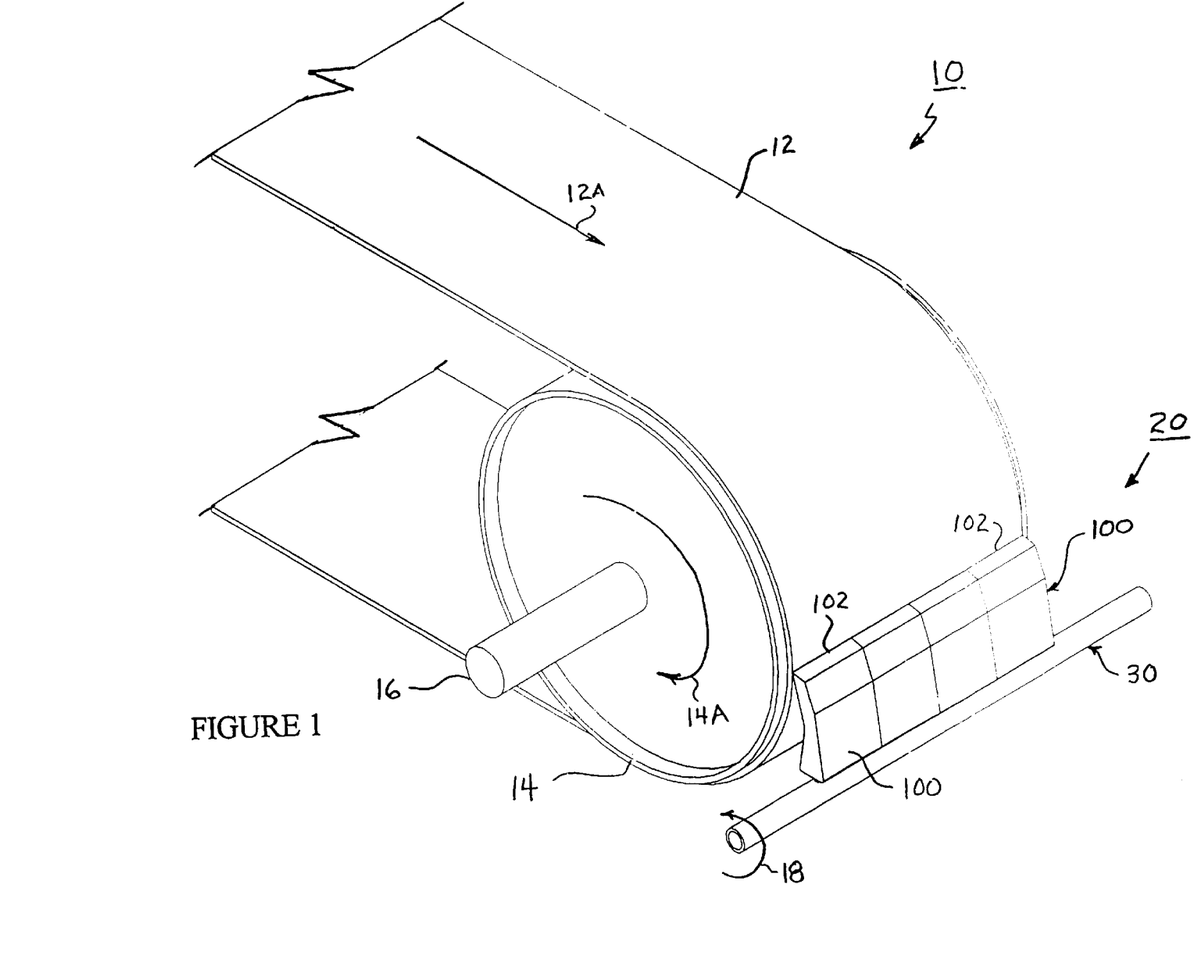
FIG. 1 is a isometric diagram of a conveyor system including scraping apparatus according to the present invention.

Conveyor system 10 includes rotatable spaced apart head and tail pulleys and a conveyor belt 12 disposed thereon and may be supported intermediate the head pulley 14 and tail pulley by arrangements of support rollers, slider bars and the like. Rotatable head pulley 14 is rotatably mounted on axle 16 and is powered to rotate in the direction indicated by the arrow 14A thereon to move conveyor belt 12 in the direction indicated by the arrow 12A thereon. Material to be conveyed is deposited onto the top of belt 12 at one or more locations along its length, is conveyed on belt 12 in the direction of travel of the top of belt 12, and is deposited by belt 12 as it passes or travels around head pulley 14 and the conveyed material falls off of belt 12, for example, due to gravity, into a receptacle or other receiving arrangement.

Depending on the consistency and stickiness of the conveyed material and the extent to which it adheres to the belt 12, more or less of the material will be deposited in the desired location, i.e. into the receptacle. To increase the efficiency of the conveyor 10 and the amount of the conveyed material deposited into the receptacle, a scraper blade 100 is arranged in a belt scraper assembly 20 to bear against belt 12 as it passes over and travels around head pulley 14, as is illustrated in FIG. 1. A belt scraper positioned against a head pulley is usually referred to as a "primary cleaner."

Blades 100 mounted on flanges 32 (not visible in FIG. 1) of mounting tube 30 have blade edges 102 bearing against conveyor belt 12 of conveyor system 10 where conveyor belt 12 passes around the head pulley 14 of conveyor system 10. Blade tensioning devices(not shown) provide a tensioning torque in the direction indicated by arrow 18 to rotate blades 100 towards conveyor belt 12 so that scraping edge 12 thereof bears against belt 12. When conveyor belt 12 moves in the direction indicated by the arrow 12A thereon, the material and debris on conveyor belt 12 is scraped off and removed as belt 12 passes beneath blade edges 102 of scraping blades 100, e.g., a plurality of similar blades 100a, 100b, 100c and so forth mounted in side-by-side abutting relationship as shown in FIG. 2.

Figure 2:
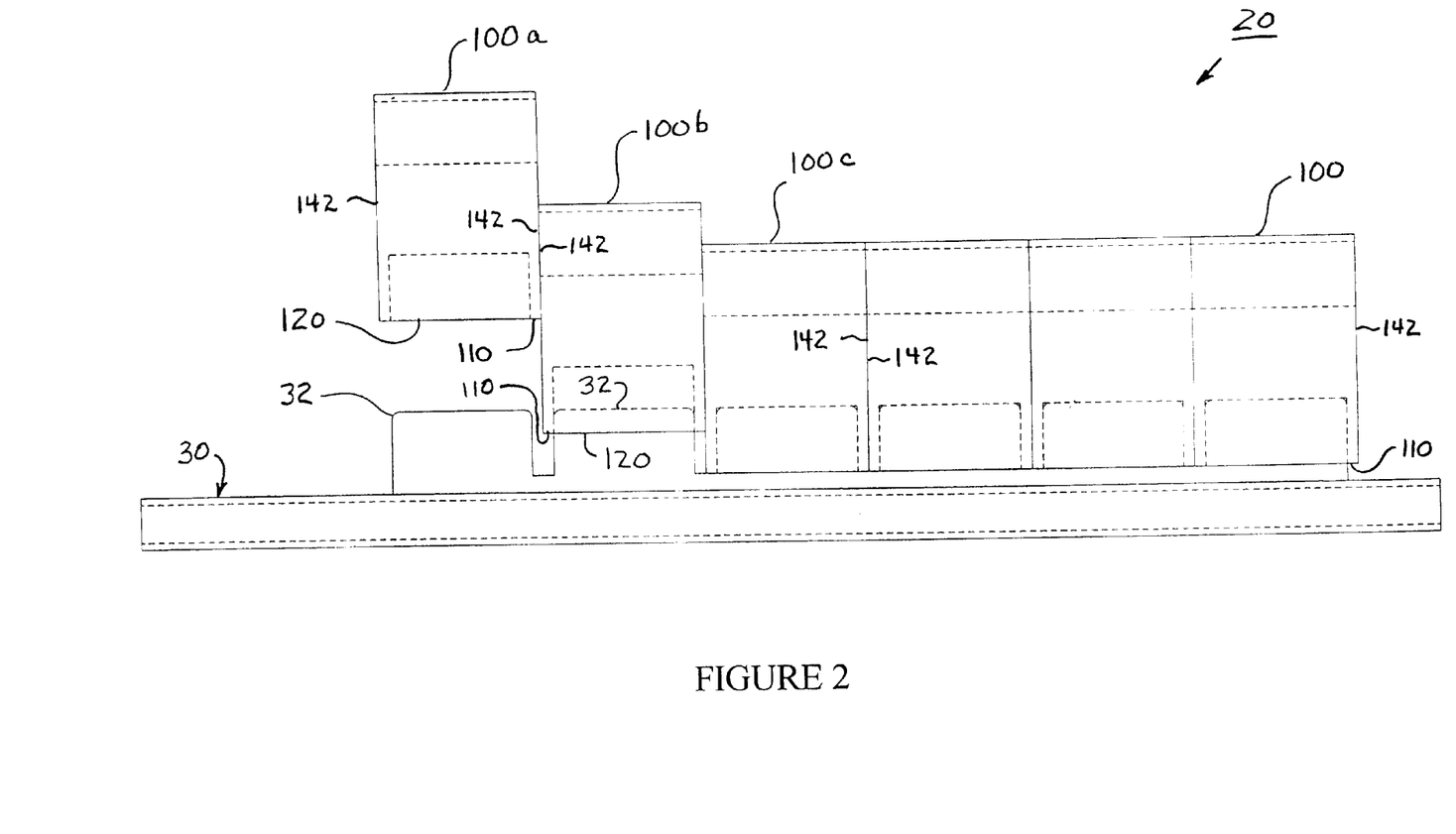
FIG. 2 is a front elevation assembly diagram of a scraping apparatus similar to that of FIG. 1 in which scraping blades are illustrated in removed, installed and partially installed positions.
Figure 3:
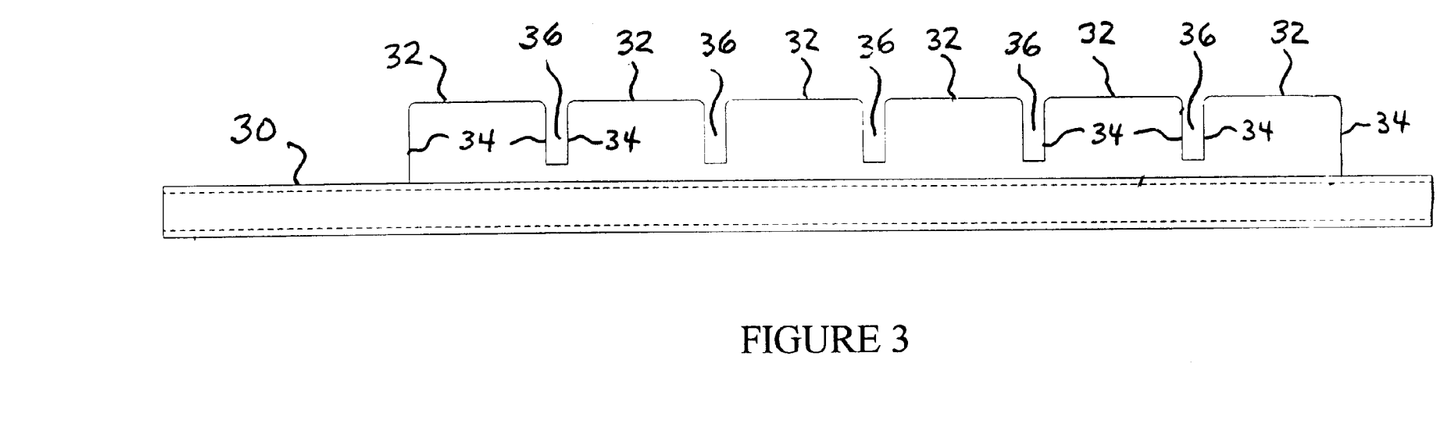
FIG. 3 is a front elevation of the mounting tube and flanges of the scraping apparatus of FIG. 2.

As shown in FIGS. 2 and 3, mounting tube 30 includes a radially-extending flange having axially-spaced slots 36 therein to define a plurality of radially-extending flanges or tabs 32 on which blades 100 are mounted. In other words, a plurality of radially-extending flanges 32 are spaced axially along mounting tube 30 for receiving blades 100 thereon. A plurality of blades 100 are mounted on the plurality of flanges 32 with their respective side walls 142 in side-by-side abutting relationship to cooperatively form a scraping blade assembly 20 of width comparable to the width of conveyor belt 12.

In FIG. 2, blade 100a is illustrated in position near a first flange 32 onto which it is to be or was mounted by flange 32 being within rectangular recess 120 in the base 110 of blade 100a. Blade 100b is illustrated near a second flange 32 onto which it is partially mounted or partially removed, i.e. with flange 32 being positioned partially within rectangular recess 120 in the base 110 of blade 100b. The width of the scraper blade assembly 20 is easily adjusted by increasing or decreasing the number of flanges 32 on mounting tube 30 and/or the number of blades 100 thereon. A tensioning force or torque is applied to mounting tube 30 in a direction to urge blade edges 102 to bear against conveyor belt 12, such as by a tensioning arrangement as set forth in U.S. Pat. No. 5,201,402 entitled "Scraper Blade Tensioning Device" issued Apr. 13, 1993 to George T. Mott, which is hereby incorporated herein by reference in its entirety. A tensioning device may be utilized on either or both ends of mounting tube 30.

As best shown in FIG. 3, flanges 32 on mounting tube 30 are separated by axially-spaced radial slots 36. Preferably, flanges 32 have substantially radial parallel sides 34 so as to be substantially rectangular and are of substantially uniform thickness. Also preferably, each of flanges 32 is of substantially the same size and shape, and each of slots 36 therebetween are of substantially the same width. Alternatively, the sides 34 of flanges 32 may be angled slightly, for example, five degrees or possibly ten degrees, so that flanges 32 are slightly trapezoidal with the edge thereof distal from mounting tube 30 being slightly shorter than the edge thereof abutting mounting tube 30, Such slightly trapezoidal shape is within the meaning of the terms "rectangular" or substantially rectangular" as those terms are used herein.

Figure 4A:
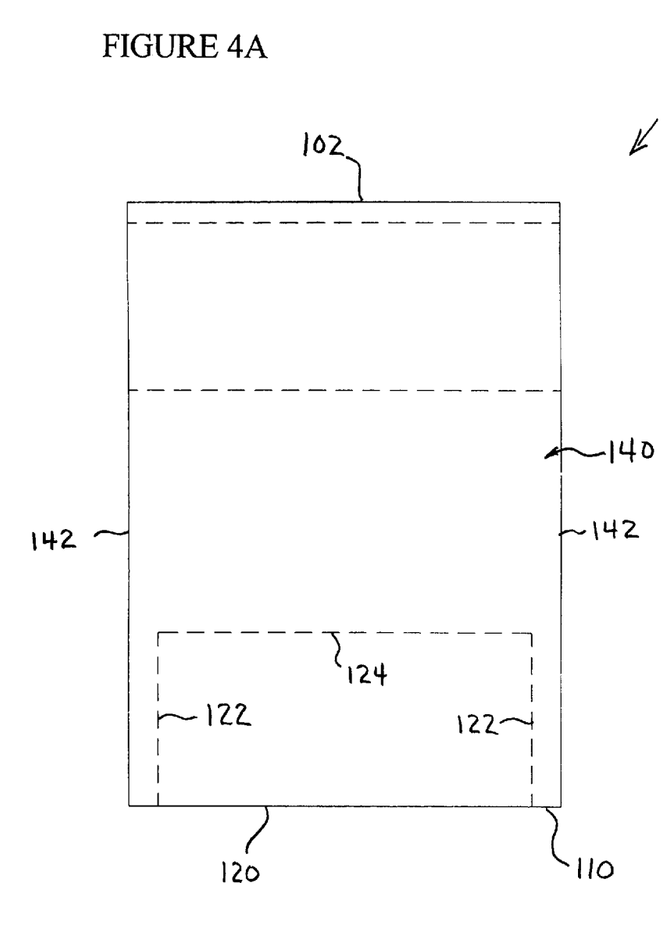
FIGS. 4A and 4B are front and side elevation views, respectively, of the scraping blade of FIG. 2.
Figure 4B:
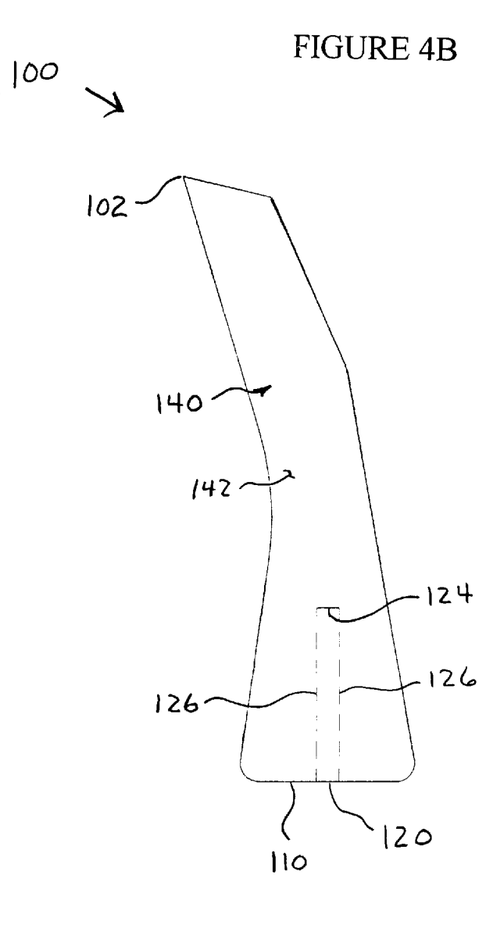

As shown in FIGS. 4A and 4B, each blade 100 has a blade edge or scraping edge 102 distal from a blade base 110, a rectangular recess 120 in blade base 110, a blade body 140 and a side wall 142. Rectangular recess 120 is defined by substantially parallel side walls 122 and substantially parallel front and back walls 126 extending away from base 110 towards edge 102 to fundus 124 which defines (or is) the bottom of recess 120, i.e the walls 122, 126 define a rectangular recess 120 having a longer dimension less than the longer dimension of blade base 110. Blade 100 has straight segmented sections to position scraping edge 102 slightly forward of the planes in which the front and back walls 126 of recess 120 lie.

Preferably, rectangular recess 120 and rectangular radial flange 32 are both substantially rectangular and are respectively sized for a slightly interfering fit, i.e. a fit that is snug, but which does not substantially deform the sides 122, 126 of rectangular recess 120. The depth of rectangular recess 120 is equal to or greater than the height of flange 32. Thus, blade 100 is secured on flange 32 by friction, but is not mechanically locked thereto. Typically, recess 120 has a width that is slightly smaller than the width of flange 32 to provide such frictional fit, i.e. the walls 122, 126 define a rectangular recess 120 having a longer dimension less than the longer dimension of blade base 110. It is noted that the direction on movement of conveyor belt 12 is such that it engages blades 100 in a direction that tends to push them onto flanges 32 rather than to remove them therefrom, so that a mechanical locking of blades 100 to flanges 32 is neither necessary nor desired.

As a result, blade 100 may be easily removed from flange 32 by hammering or other wise urging blade base 110 away from mounting tube 30 with sufficient force to overcome friction. If the side edges 34 of flange 32 are not parallel, as is preferred, they may be angled so that flange 32 is slightly narrower at its end distal from mounting tube 30 than it is at its end proximate thereto. Likewise, if the sides 122, 126 of rectangular recess 120 are not parallel, as is preferred, they may be angled slightly so that rectangular recess 120 is slightly narrower at its fundus or bottom 124, i.e. end distal from mounting tube 30, than it is at its opening in base 110.

Thus, the substantially rectangular recess 120 of blade 100 substantially surrounds flange 32 radially extending from mounting tube 30 to prevent dirt and other debris from entering in between the walls 122, 126 of the rectangular recess 120 and rectangular flange 32. The sides 122, 126 of the rectangular recess 120 and of the flanges 32 are each substantially parallel so as to prevent any mechanical locking of blade 100 to flange 32 thereby providing ease of blade installation and removal.

In an exemplary blade 100 of the sort shown in FIGS. 4A and 4B, which is a heavier blade intended for more demanding heavy-duty applications, such as bearing against belt 12 under high tension and/or with especially heavy or sticky material, approximate typical dimensions for each blade include being 6 inches between side walls 142, 8¼ inches tall between base 110 and blade edge 102, 2½ inches thick at its base 110, and blade edge 102 is 2 inches forward of the center of rectangular recess 120.

Figure 5A:
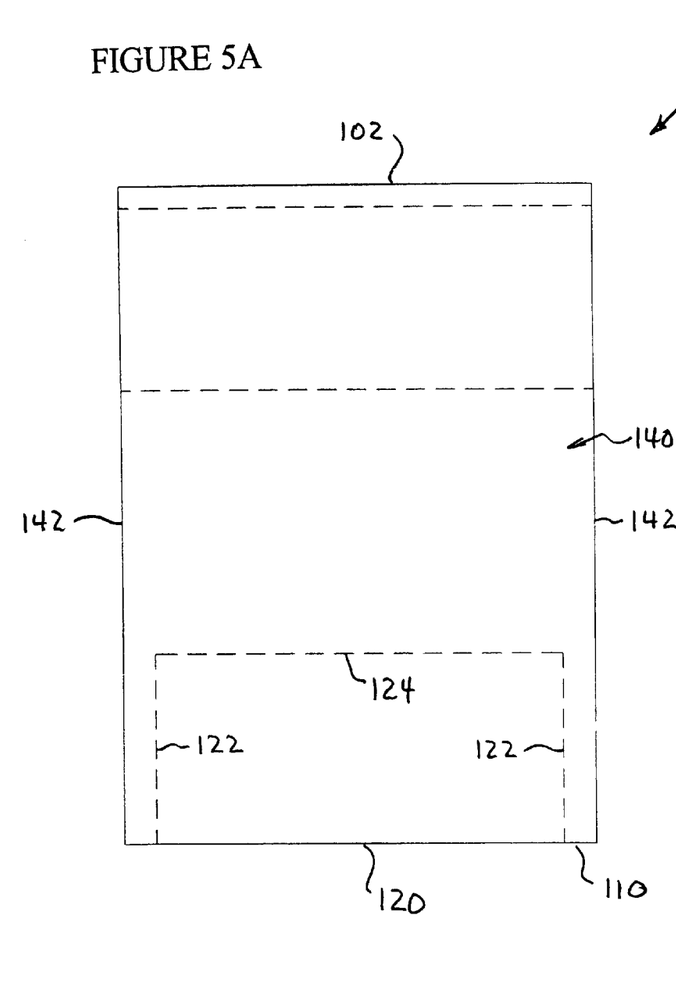
FIGS. 5A and 5B are front and side elevation views, respectively, of an alternative embodiment of a scraper blade in accordance with the present invention.
Figure 5B:
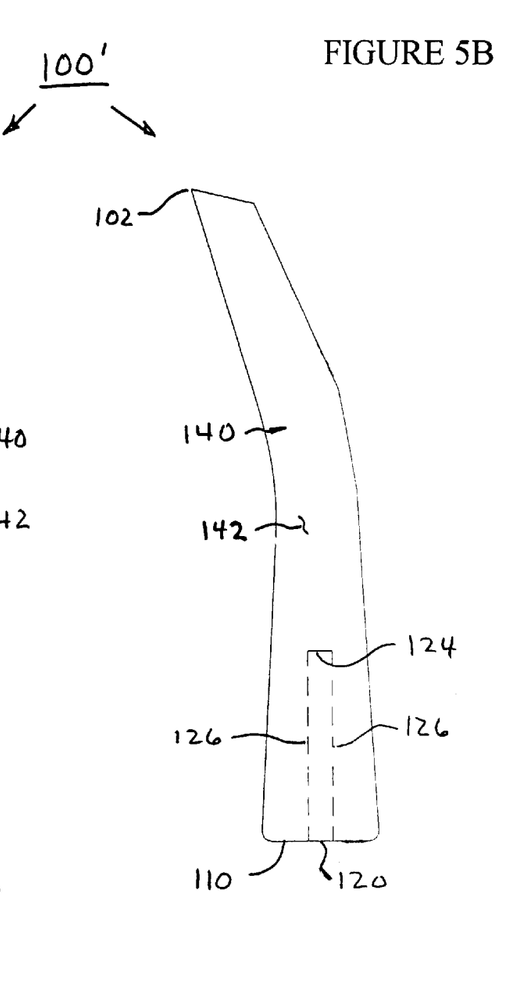

In an alternative exemplary blade 100' of the sort shown in FIGS. 5A and 5B, which is a slightly smaller, lighter-duty blade intended for less demanding applications, approximate typical dimensions for each blade include being 6 inches wide between side walls 142, 8⅛ inches tall between base 110 and blade edge 1102, 1½ inches thick at its base 110, and blade edge 102 is 1 9/16 inches forward of the center of rectangular recess 120.

A number of six-inch wide blades 100' are utilized in side-by-side abutting relationship on mounting tube 30 to provide a scraping edge 102 that is compatible with the width of conveyor 12. For example, the four blade assembly 20 of FIG. 1 is suitable for use with a conveyor belt 12 of about 24-inch width and the six-blade assembly 20 of FIG. 2 is suitable for use with a conveyor belt 12 of about 36-inch width. Blades 100, 100' are sometimes referred to as a "pocket" blades or "pocket belt cleaners."

Figure 6:
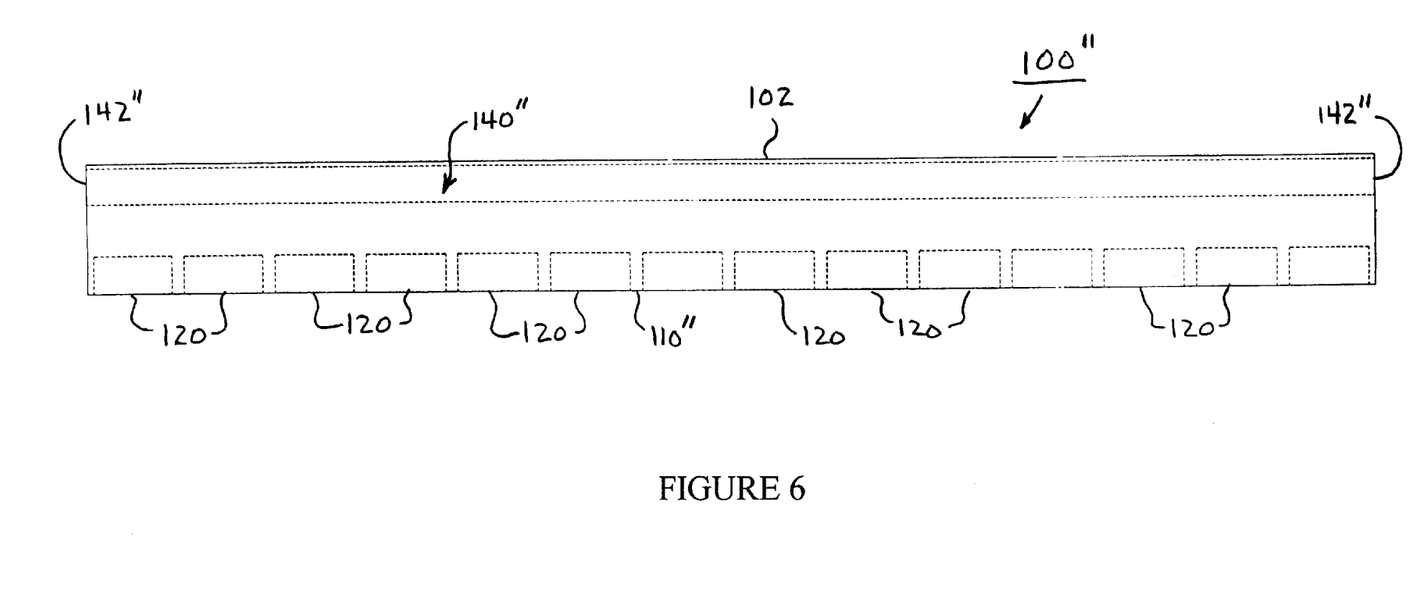
FIG. 6 is a front elevation view of a further alternative embodiment of a scraper blade in accordance with the present invention.

FIG. 6 shows an alternative embodiment of a blade 100" in accordance with the present invention which is of greater width than the blades 100, 100' described above which each included one rectangular recess 120 and of which a number of blades 100 or 100' were utilized to provide a segmented blade assembly of a width compatible with the width of conveyor belt 12. Blade 100" includes a plurality of rectangular recesses 120 in the base 110" thereof that mount on a plurality of radially-extending flanges 32 of mounting tube 30. Preferably, recesses 120 are centered and evenly spaced along base 110" so as to mount to the same mounting tube as would accept a number of blades 100 or 100'. The exemplary blade 100" of FIG. 6 includes 14 rectangular recesses and is usable in place of 14 of blades 100 or 100'. Approximate typical dimensions for blade 100" include 7 feet between end walls 142" and 6-inch center-to-center spacing of recesses 120. The side view of blade 100" may be the same as that of blade 100 or of blade 100' or other suitable shape and dimension. Blade 100" is sometimes referred to as a "multi-pocket" blade or "multi-pocket belt cleaner."

For each of the blades 100, 100' and 100" described above, rectangular recess 120 therein is centered in base 110 and is of approximate typical dimension 5 3/16 inches long between walls 122 by 5/16 inch wide between walls 126 by 2⅜ inches deep to fundus 124, and the preferred material for blades 100, 100' and 100" is an elastomeric polymer, such as a polyurethane or urethane, and may be cast, molded or machined to shape. The urethane is preferably of about 82–85 durometer. Typically, a recess 120 having a width that is smaller than the width of flange 32 by about 1/32 inch or less is sufficient to provide the desired frictional fit.

The approximate typical dimensions of a mounting tube 30 compatible with the typical dimensions of blades 100, 100' 100" above include flanges 32 that are 5 3/16 inches in width, 5/16 inch thick and 2⅜ inches in height between the base of slot 36 and the edge of flange 32 distal from mounting tube 30. Preferably, the bottoms of slots 36 are about 3 inches radially outward from the surface of mounting tube 30 so as to ease the application of force to the base 110 of the blade 100. 100", 100" to remove same from mounting tube 30. Flanges 32 are on six-inch center-to-center spacing and the bottom of slots 36 is 13/16 inch. Typically and preferably, flanges 32 are fabricated from one piece of 5/16-inch thick steel that is welded to a 1.9-inch diameter steel mounting tube 30. The radial edges of flange 32 may be angled, preferably about five degrees, to narrow the edge of flange 32 distal from mounting tube 30, which eases the installation and removal of blades 100, 100' and 100".

Among the advantages of the foregoing arrangement are that blade 100 is easily and conveniently replaceable. Replacement of blade 100 is accomplished by releasing the tension maintained through mounting tube 30 and lifting blade 100 off flange 32 of mounting tube 30. If additional force is needed, a prying bar or other lever, or a suitable impact device, such as a hammer, may be utilized. Installation of blade 100 is accomplished by reversing the foregoing steps, and blade 100 may be firmly seated on flange 32 by a suitable impact device. Where blade 100 is comprised of a plurality of blade segments 100 or 100', if clearance is sufficient, blade segments 100' are replaceable individually.

Figure 7A:
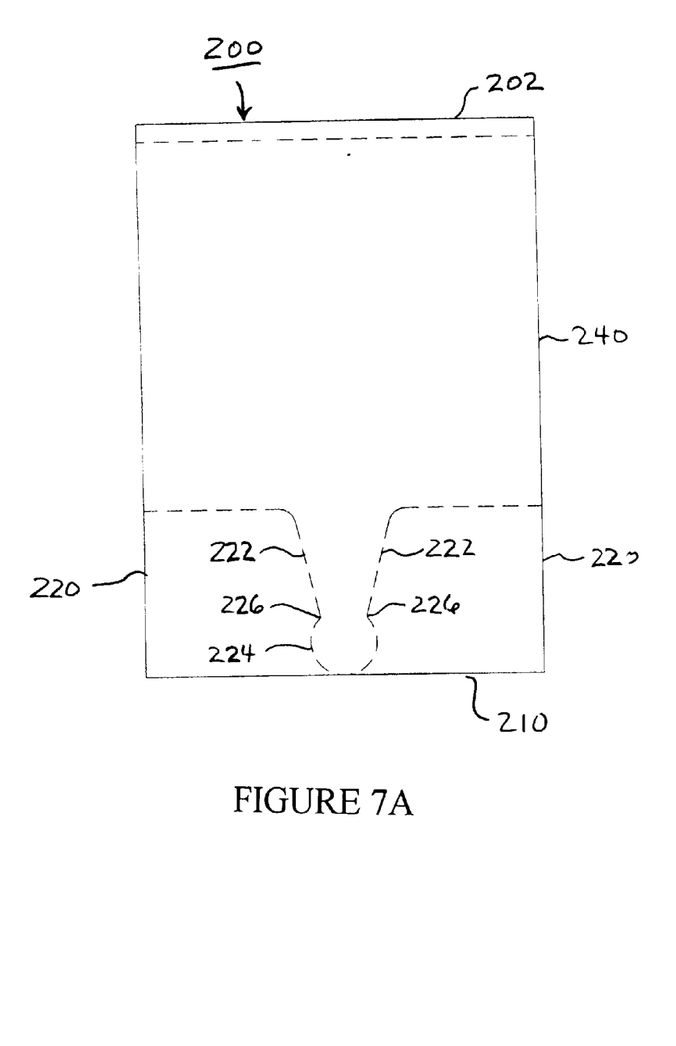
FIGS. 7A and 7B are front and side elevation views, respectively, of a prior art blade.
Figure 7B:
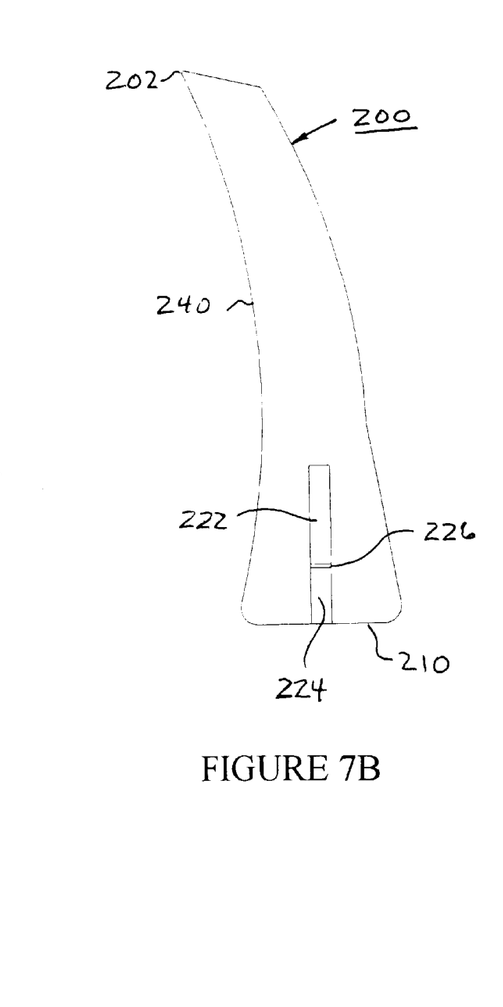

On the other hand, prior art blade 200 shown in FIGS. 7A and 7B has a slot 220 extending across the full width of its blade body 240 at base 210 and has a locking lug 224 located in the slot 220 midway between the ends of the slot 220 at the sides of blade 200. Sloping walls 222 of blade 200 define a trapezoidal filler in slot 220 that joins with circular lug 224 at indentations 226, together having a keyhole-like shape. Locking lug 224 is an enlarged circular lug that provides convex physical engaging features that become physically captive in a corresponding concave portion of an enlarged circular opening 238 or recess in flange 232 as shown in the diagram of a prior art assembly of FIG. 8. In addition, sloping edges 234 of flange 232 define a trapezoidal portion of a slot and projections 236 therein that correspond to sloping walls 222 and indentations 226. Thus the slot in flange 232 has a keyhole-like shape that mechanically engages the keyhole shaped locking lug 222, 224 of prior art blade 200. Flanges 232 are attached to support 230.

Figure 8:
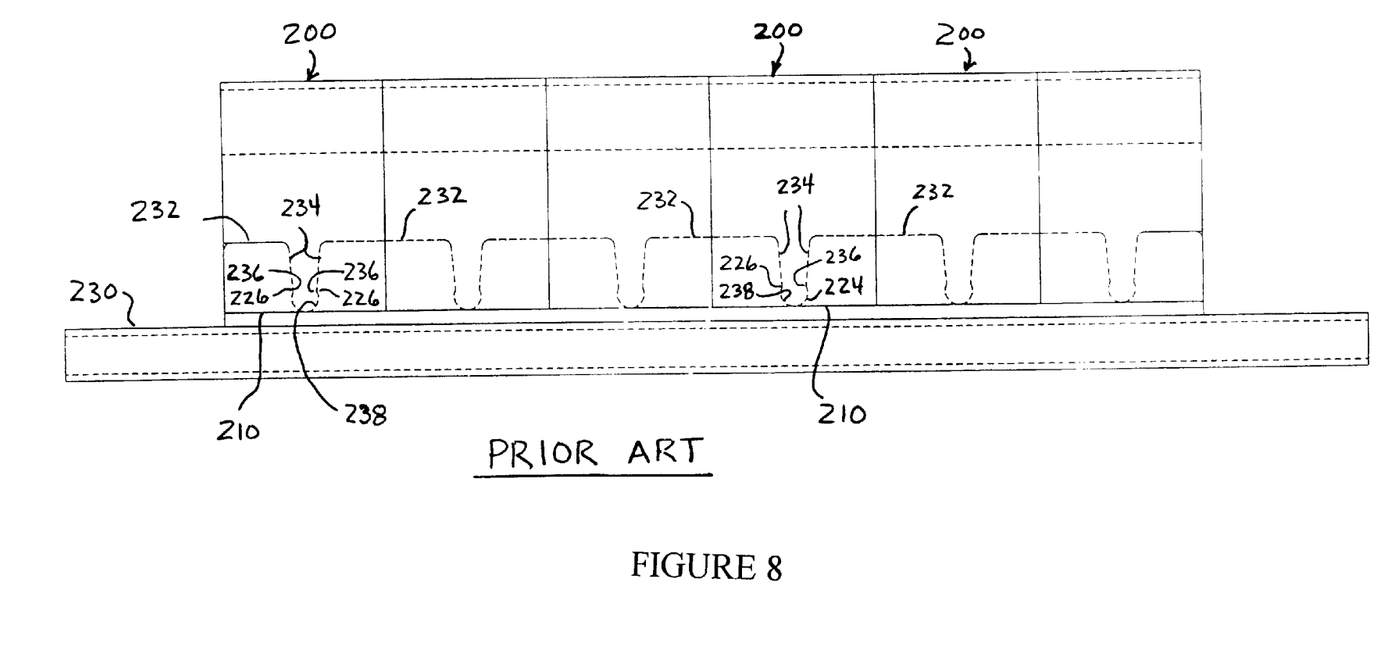
FIG. 8 is a front elevation view of a prior art assembly of the prior art blades of FIGS. 7A and 7B in locking engagement with a prior art flanges.

Locking lug 224 must be deformed during installation and removal to pass through the narrow constriction formed by projections 236, but is generally not deformed when positioned in the enlarged circular portion 238 of the slot in flange 232. While such mechanical locking lug 224 may seem beneficial, it is in fact a disadvantage in practical application for several reasons. Because the locking lug 224 must be deformed in order to become seated in the enlarged portion 238 of the slot in flange 232 or to be removed therefrom, i.e. to pass between projections 236, there can be great resistance to such deformation making installation and removal of prior art blades 200 difficult. In cold weather, particularly at temperatures of about 20° F. or lower, when the urethane material (e.g., 90 durometer urethane) of which prior art blade 200 typically is made becomes very hard, it may not be possible to deform it sufficiently to install or remove prior art blades 200. In addition, because the ends of the slot 220 in prior art blade 200 are open, material and debris may enter into the slot 220, which can further make installation and removal of prior art blades 200 difficult or may cause undesirable wear.

Figure 9:
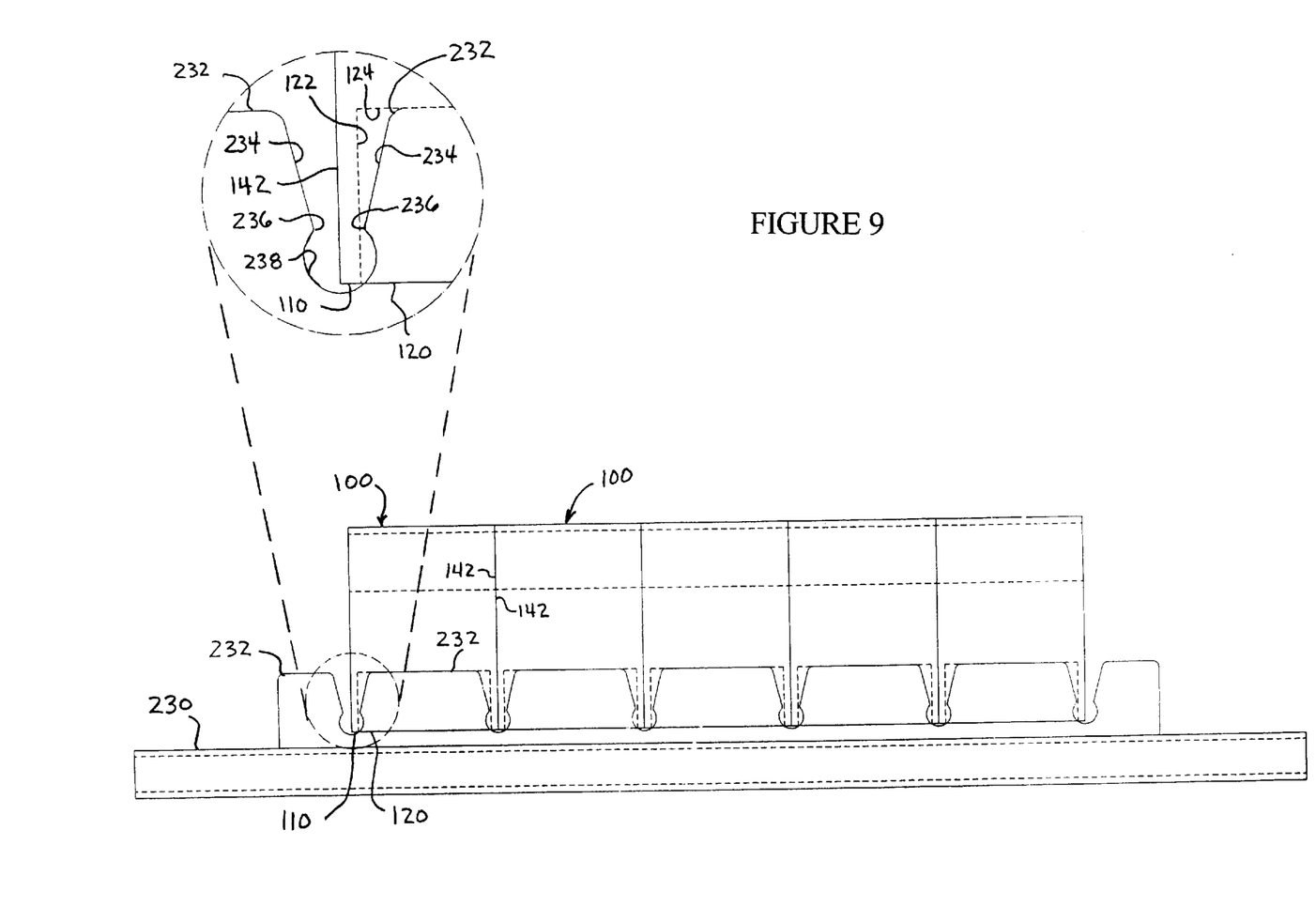
FIG. 9 is a front elevation view of blades according to the present invention mounted on the prior art flanges of FIG. 8.

The problems of the prior art assembly and blade 200 are avoided when a blade in accordance with the present invention, such as any of blades 100, 100' and 100", is employed with the prior art mounting flange 232. AS shown in FIG. 9, blades 100 are installed onto prior art flanges 232 with flanges 232 extending into recesses 120 in the bases 110 of blades 100 and in frictional contact with the walls 122 and/or 126 of recesses 120. Blades 100 for such use have recesses 120 sized to be in slightly interfering or frictional engagement with the edges 234, 236 of prior art flanges 232, but not in mechanical locking thereto, and recesses 120 have a depth that is equal to or slightly greater than the height of flanges 232. Because blades 100 are of a hard material, such as 82–85 or 90 durometer urethane, the walls 122 of recesses 120 do not deform to engage the locking feature 234, 236, 238 of the prior art flange 232, but simply bear against flanges 232. Thus blades 100 are retained on flanges 232 by friction between the side surfaces 122 of rectangular recess 120 and flanges 232 and not by engaging a circular lug 224 or other locking feature in an enlarged opening 238 or any other physical or mechanical locking arrangement, such as projections 236 fitting into and engaging indentations 226.

When installed onto prior art flanges 232, sidewalls 142 of adjacent blades 100 will be in side-by-side abutting relationship in the keyhole-shaped slots between prior art flanges 232, and blades 100 will be in positions offset transversely (axially along support 230) by one-half the width of blade 100 with respect to the positions that prior art blades 200 would be in if installed on the same flanges 232, as can be seen by comparing FIGS. 9 and 8.

Figure 10A:
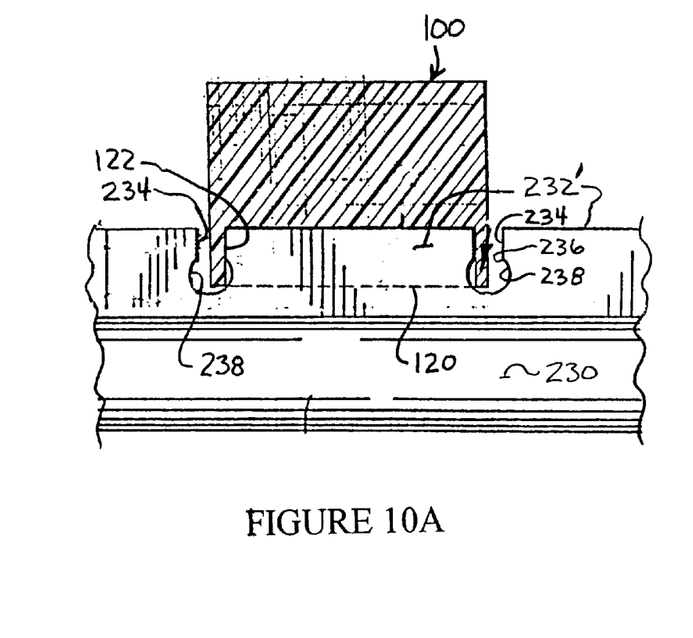
FIGS. 10A and 10B are front cross-sectional views of a blade in accordance with the present invention mounted on the prior art flange of FIG. 8.
Figure 10B:
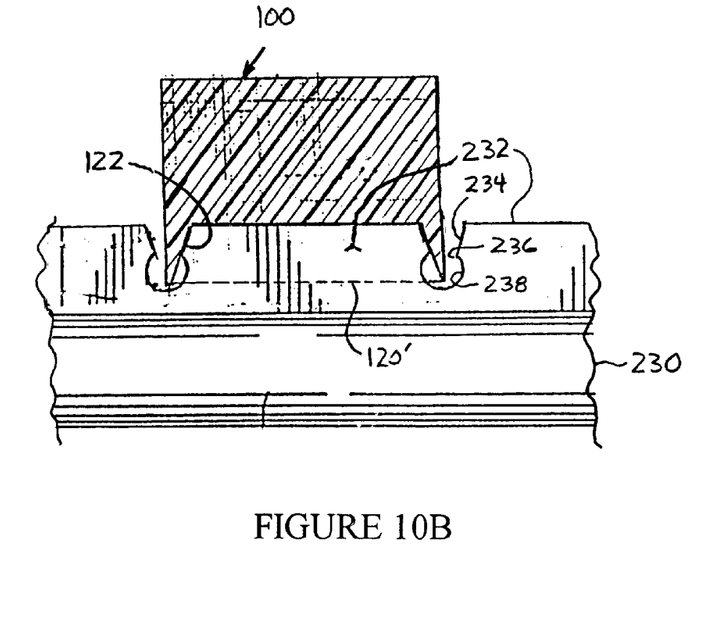

Preferably, the sides 122 of recess 120 of blade 100 are parallel or angled to correspond with the parallel or angled edges of the flange to which they are intended to be mounted. Thus, it is preferred to taper recess 120 to conform to the shape of the flange 32, 232, 232' onto which blade 100 is to be mounted. For example, FIGS. 10A and 10B show respectively a straight-sided recess 120 having parallel walls 122 mounted on a flange 232' having parallel edges 234 and a tapered recess 120' having angled walls 122 mounted of a flange 232 having correspondingly angles walls 234. It is again noted that walls 122 of rectangular recess 120 are substantially straight and do not have any projection or indentation formed therein intended to engage any locking feature. Even though walls 122 may be slightly deformed by projections 236, for example, blades 100, 100', 100" are intended to be held in position by friction between the walls 122, 126 of rectangular recess 120 in base 110 thereof and the flange(s) on which it is mounted.

While the present invention has been described in terms of the foregoing exemplary embodiments, variations within the scope and spirit of the present invention as defined by the claims following will be apparent to those skilled in the art. For example, blades 100, 100', 100" and like blades may be arranged to mount to one, two, three or any number of flanges, and the flanges may be either rectangular or have slightly angled edges, so long as the edges of the flange(s) are in frictional contact with at least a portion of the walls of the rectangular recess(es) in the base of the blade. In addition, while the blade herein is believed best suited for a primary cleaning of a belt at the head pulley, it may also be applied at a location intermediate the head and tail pulleys, or at the tail pulley, as a secondary cleaner blade The size of blade 100, 100', 100" may be increased or decreased as is convenient far a particular installation. For example, an oversized blade as might be employed with a high-speed conveyor belt, or with a wide conveyor belt or a large diameter head pulley, and the height of blade 100, 100', 100" between blade base 110 and blade edge 102 may be greater, for example, about 14–16 inches. Further, plural blades and/or blade segments 100, 100', 100" may be employed, and may be arranged in a substantially straight line or in a staggered or other displaced arrangement, although a straight line arrangement employing mounting tube 30 is preferred.

What is claimed is:

1. A blade adapted for frictional mounting on a flange comprising a blade body having a base and a blade edge distal from the base, said blade body having a substantially rectangular recess in the base thereof adapted for frictional mounting on a flange, wherein the longer dimension of the rectangular recess is less than the longer dimension of the base.

2. The blade of claim 1 wherein the substantially rectangular recess is defined by opposing walls that are substantially parallel.

3. The blade of claim 1 wherein the substantially rectangular recess is defined by opposing walls that are angled such that the opening of the substantially rectangular recess is larger than is the fundus thereof.

4. The blade of claim 1 wherein said blade body is formed by casting, molding or machining a material selected from the group consisting of an elastomeric polymer, a polyurethane and a urethane.

5. The blade of claim 4 wherein said material is of about 82–85 durometer.

6. A blade assembly comprising:
   a mounting having a plurality of radially extending flanges; and
   a plurality of blades each comprising a blade body having a base and having an edge distal from the base, each said blade body having a substantially rectangular recess in the base thereof frictionally mounted on one of the plurality of radially extending flanges,
   wherein the longer dimension of the rectangular recess is less than the longer dimension of the base.

7. The blade assembly of claim 6 wherein said radially extending flanges are substantially rectangular.

8. The blade assembly of claim 6 wherein said radially extending flanges have sides defining a mechanical locking feature, and wherein sides of the substantially rectangular recesses of said blades are in frictional contact with the mechanical locking feature, but not in mechanical locking engagement therewith.

9. The blade assembly of claim 6 wherein said radially extending flanges have sides defining a mechanical locking feature, and wherein sides of the substantially rectangular recesses of said blades are in frictional contact with the sides of said flanges, but not in locking engagement with the mechanical locking feature thereof.

10. A blade assembly comprising:
    a mounting having a plurality of radially extending flanges; and
    at least one blade comprising a blade body having a base and an edge distal from the base, said blade body having at least one substantially rectangular recess in the base thereof frictionally mounted on one of the plurality of radially extending flanges,
    wherein the longer dimension of the rectangular recess is less than the longer dimension of the base.

11. The blade assembly of claim 10 wherein said radially extending flanges are substantially rectangular.

12. The blade assembly of claim 10 wherein said radially extending flanges have sides defining a mechanical locking feature, and wherein sides of the at least one substantially rectangular recess of said at least one blade are in frictional contact with the mechanical locking feature, but not in mechanical locking engagement therewith.

13. The blade assembly of claim 10 wherein said radially extending flanges have sides defining a mechanical locking feature, and wherein sides of the at least one substantially rectangular recess of said at least one blade are in frictional contact with the sides of at least one of said flanges, but not in locking engagement with the mechanical locking feature thereof.

14. A blade for scraping an endless belt conveyor comprising:
   a blade base adapted to engage a blade mount having a substantially rectangular flange;
   an elastomeric blade body extending from said blade base and having a forward side and a rearward side, said forward side having a blade edge substantially parallel to said blade base and adapted for engaging an endless belt; and
   said blade body having a substantially rectangular recess therein having an opening at said blade base adapted for receiving the substantially rectangular flange,
   wherein the longer dimension of the rectangular recess is less than the longer dimension of the blade base.

15. The blade of claim 14 wherein the substantially rectangular recess is defined by opposing walls that are substantially parallel.

16. The blade of claim 14 wherein the substantially rectangular recess is defined by opposing walls that are angled such that the opening of the substantially rectangular recess is larger than is the fundus thereof.

17. The blade of claim 14 wherein said b lade body is formed by casting, molding or machining a m material selected from the group consisting of an elastomeric polymer, a polyurethane and a urethane.

18. The blade of claim 17 wherein said material is of about 82–85 durometer.

19. Apparatus for scraping a belt comprising:
   a scraping blade comprising:
      a blade base;
      a blade body extending from said blade base and having a forward side and a rearward side, said forward side having a blade edge substantially parallel to said blade base for engaging the belt; and
      said blade body having at least one substantially rectangular recess therein having an opening at said blade base adapted to engage a substantially rectangular flange;
      wherein the longer dimension of the rectangular recess is less than the longer dimension of the blade base; and
   a blade mount assembly comprising:
      at least one substantially rectangular flange for frictionally engaging the at least one substantially rectangular recess of said blade body; and
      a rotatable mount rotatably supporting said at least one rectangular flange and urging the blade edge of said scraping blade against the belt.

20. The apparatus of claim 19 wherein said at least one radially extending flange is substantially rectangular.

21. The apparatus of claim 19 wherein said at least one radially extending flange has sides defining a mechanical locking feature, and wherein sides of the at least one substantially rectangular recess of said scraping blade are in frictional contact with the mechanical locking feature, but not in mechanical locking engagement therewith.

22. The apparatus of claim 19 wherein said at least one radially extending flange has sides defining a mechanical locking feature, and wherein sides of the at least one substantially rectangular recess of said scraping blade are in frictional contact with the sides of said at least one flange, but not in locking engagement with the mechanical locking feature thereof.

23. A blade comprising a blade body having a base and a blade edge distal from the base, said blade body having a substantially rectangular recess in the base thereof adapted for frictional mounting, wherein the longer dimension of the rectangular recess is less than the longer dimension of the base.

* * * * *